United States Patent [19]

Kinoshita

[11] Patent Number: 5,208,113
[45] Date of Patent: May 4, 1993

[54] POWER GENERATION METHOD USING MOLTEN CARBONATE FUEL CELLS

[75] Inventor: Noboru Kinoshita, Chiba, Japan
[73] Assignee: Ishikawajima-Harima Heavy Industries Co., Ltd., Tokyo, Japan
[21] Appl. No.: 727,888
[22] Filed: Jul. 10, 1991
[51] Int. Cl.$^5$ ............................................. H01M 8/14
[52] U.S. Cl. ........................................ 429/16; 429/17
[58] Field of Search ...................... 429/16, 17; 55/90

[56] References Cited

U.S. PATENT DOCUMENTS

| | | | |
|---|---|---|---|
| 3,527,618 | 9/1970 | Bushnell | 136/86 |
| 4,013,431 | 3/1977 | Berkel et al. | 55/90 |
| 4,170,458 | 10/1979 | Hartwick | 55/90 X |
| 4,751,151 | 6/1988 | Healy et al. | 429/17 |
| 4,791,033 | 12/1988 | Patel | 429/19 |
| 5,068,159 | 11/1991 | Kinoshita | 429/17 X |
| 5,079,103 | 1/1992 | Schramm | 429/17 |

FOREIGN PATENT DOCUMENTS

| | | |
|---|---|---|
| 0376219 | 7/1990 | European Pat. Off. . |
| 2012819 | 7/1968 | France . |
| 63-241877 | 7/1988 | Japan . |
| 3-216964 | 9/1991 | Japan . |

OTHER PUBLICATIONS

European Search Report, EP application 91111191.2, Mar. 23, 1992.
Chemical Abstracts, vol. 110, No. 12, Mar. 20, 1989, Columbus, Ohio US; Abstract No. 98842P, Mitsuta Susumu and All: "Energy recovery from fuel-cell off-gas" p. 216, col. 1.
Patent Abstracts of Japan, vol. 15, No. 498 (E-1146)(5026) Dec. 17, 1991.

*Primary Examiner*—Stephen Kalafut
*Attorney, Agent, or Firm*—Trexler, Bushnell, Giangiorgi & Blackstone, Ltd.

[57] ABSTRACT

The method of producing electrical power using a molten carbonate fuel cell, a reformer and a $CO_2$ separator, comprises the steps of: introducing oxidizing gas to a cathode of the fuel cell; introducing raw material gas to be reformed to the reformer together with steam to obtain fuel gas; introducing the fuel gas to an anode of the fuel cell; introducing to the $CO_2$ separator gases discharged from the anode (referred to as "anode exhaust gas"); introducing liquid absorbent of a predetermined temperature to the $CO_2$ separator; allowing the anode exhaust gas to contact the absorbent inside the $CO_2$ separator such that $CO_2$ of the anode exhaust gas is absorbed and separated by the absorbent and such that the $CO_2$-removed anode exhaust gas contains in the form of steam moisture which corresponds to vapor pressure of the absorbent; introducing the $CO_2$-removed anode exhaust gas to the reformer from the $CO_2$ separator together with the raw material such that reformation of the raw material gas occurs and the raw material gas is converted into the fuel gas, whereby an electrochemical reaction takes place between the anode and the cathode to produce the electrical energy.

9 Claims, 2 Drawing Sheets

POWER GENERATION METHOD USING MOLTEN CARBONATE FUEL CELLS

BACKGROUND OF THE INVENTION

1. Technical Field

The present invention relates to a power generation method using molten carbonate fuel cells which directly convert chemical energy of fuel into electric energy.

2. Background Art

A conventional fuel cell system is generally comprised of a stack of fuel cell elements and separators interposed between two adjacent fuel cell elements. Each fuel cell generally includes an electrolyte plate (tile), a cathode (oxygen electrode) and an anode (fuel electrode). In case of molten carbonate fuel cell, the electrolyte plate includes a porous substance soaked with molten carbonate, and the cathode and the anode sandwich the electrolyte plate. Oxidizing gas is fed to the cathode and fuel gas is fed to the anode in order to cause power generation.

The fuel gas used for the fuel cell is generally reformed by a reformer. FIG. 2 of the accompanying drawings shows a power generation system using a molten carbonate fuel cell in which natural gas is used as the fuel to be reformed (referred to as "raw material gas"). Before feeding oxidizing gas to a cathode 2 of a fuel cell 1, air A delivered by blower 4 is preheated by an air preheater 5 in an air feed line 6. Part of the air A is introduced to a reformer 8 by a branch line 7. Gases discharged from the cathode 2 are introduced to a turbine 10 by a line 9 and then expelled via the air preheater 5. On the other hand, natural gas NG (for example, methane) which is fed to the anode 3 and reformed therein is pressurized by a blower 18 and forced to flow through a natural gas preheater 11 and a desulfurizer 23 before reaching the reformer 8. The natural gas NG (raw material gas) is reformed in the reformer 8 and fed to the anode 3 from a fuel gas line 19. Gases AG discharged from the anode 3 (called "anode exhaust gas") contain moisture that has to be removed. The moisture (steam) separated from the anode exhaust gas is mixed with the natural gas NG before an entrance of the reformer 8. To this end, the anode exhaust gas AG is led to the natural gas preheater 11 from an anode exit gas line 20, and cooled and condensed by a condenser 12 and the gas component of the anode exhaust gas is separated from the moisture component by a gas-liquid separator 14 so as to separate it into gas G and water. The gas G is introduced to the reformer 8 by a blower 13 and used for combustion. The water ($H_2O$) is pressurized by a pump 15 and transferred to a vaporizer 16. The water becomes steam in the vaporizer 16 and flows in a steam line 17 to merge with the natural gas NG of the natural gas introduction line 22 on the reformer entrance side. Gases discharged from the reformer 8 which contain $CO_2$ flow through an exhaust gas line 21 and enter the cathode 2 with the air of the air feed line 6.

However, this type of power generation system has drawbacks; the steam required for the reforming reaction is made from water. Thus, the vaporizer 16 is a requisite. Further, the water to be introduced to the vaporizer 16 should be high-purity water so that a water treatment equipment (generally a water treatment equipment adapted to prepare boiler-water, i.e., a gas-liquid separator) is necessary.

SUMMARY OF THE INVENTION

An object of the present invention is to provide a method of producing electrical power using molten carbonate fuel cells, which method does not need a steam-producing device, heat for vaporizing water and a water treatment equipment in obtaining steam necessary for reformation of fuel gas.

According to one aspect of the present invention, there is provided a method of producing electric power using molten carbonate fuel cells, characterized in that raw material gas to be reformed is introduced to a reformer with steam to obtain fuel gas, that the fuel gas is introduced to an anode of a fuel cell while oxidizing gas is introduced to a cathode of the fuel cell such that electro-chemical reaction takes place between the anode and the cathode to produce electric power, that gases discharged from the anode (called "anode exhaust gas") are introduced to a carbon dioxide gas separation device such that carbon dioxide gas is removed upon contacting of the anode exhaust gas with liquid absorbent, that the absorbent is maintained at a predetermined temperature such that the anode exhaust gas have moisture corresponding to vapor pressure of water of the absorbent, and that the anode exhaust gas from which the carbon dioxide has been removed is mixed with the raw material gas at a position upstream of the reformer. When the anode exhaust gas is led to the carbon dioxide gas separation device, the anode exhaust gas contacts the absorbing liquid so that the carbon dioxide and the moisture of the anode exhaust gas are separated from each other. At this situation, the absorbing liquid is set to a predetermined temperature so that the anode exhaust gas can hold steam required for the reformation. In other words, the anode exhaust gas holds the moisture which the liquid absorbent originally possesses. This method makes it unnecessary to employ the steam producing device and the gas-liquid separator.

DESCRIPTION OF THE PREFERRED EMBODIMENTS

Now, a preferred embodiment will be described with FIGS. 1 and 2 of the accompanying drawings.

Figure 1:
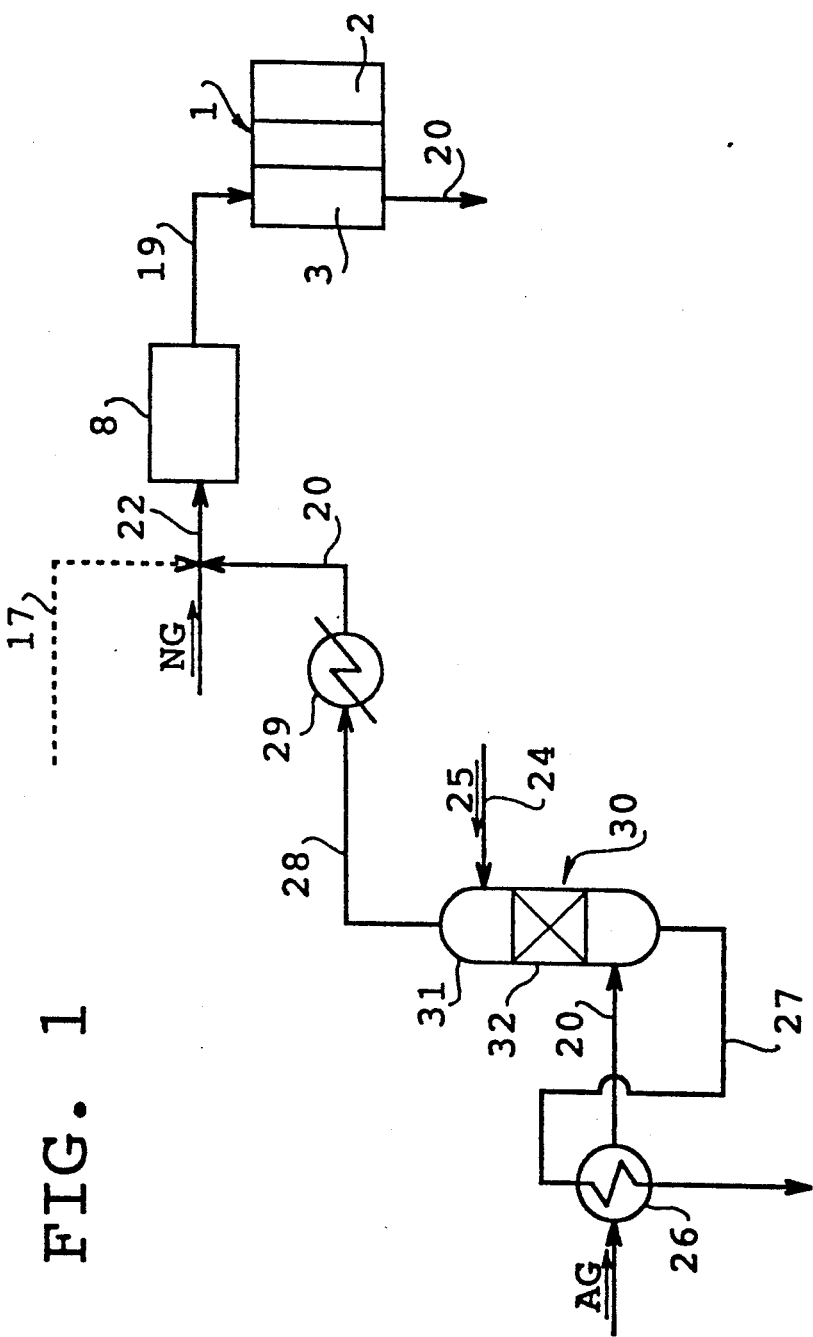
FIG. 1 shows a schematic block diagram of a power generation system using fuel cells used to carry out a power generation method according to the present invention.

FIGS. 1 illustrates a major part of a power generation system adapted to carry out a power generation method of the present invention. Other parts of the power generation system are basically identical to corresponding parts of the system illustrated in FIG. 2 and the same numerals are assigned to the same elements in FIGS. 1 and 2.

Figure 2:
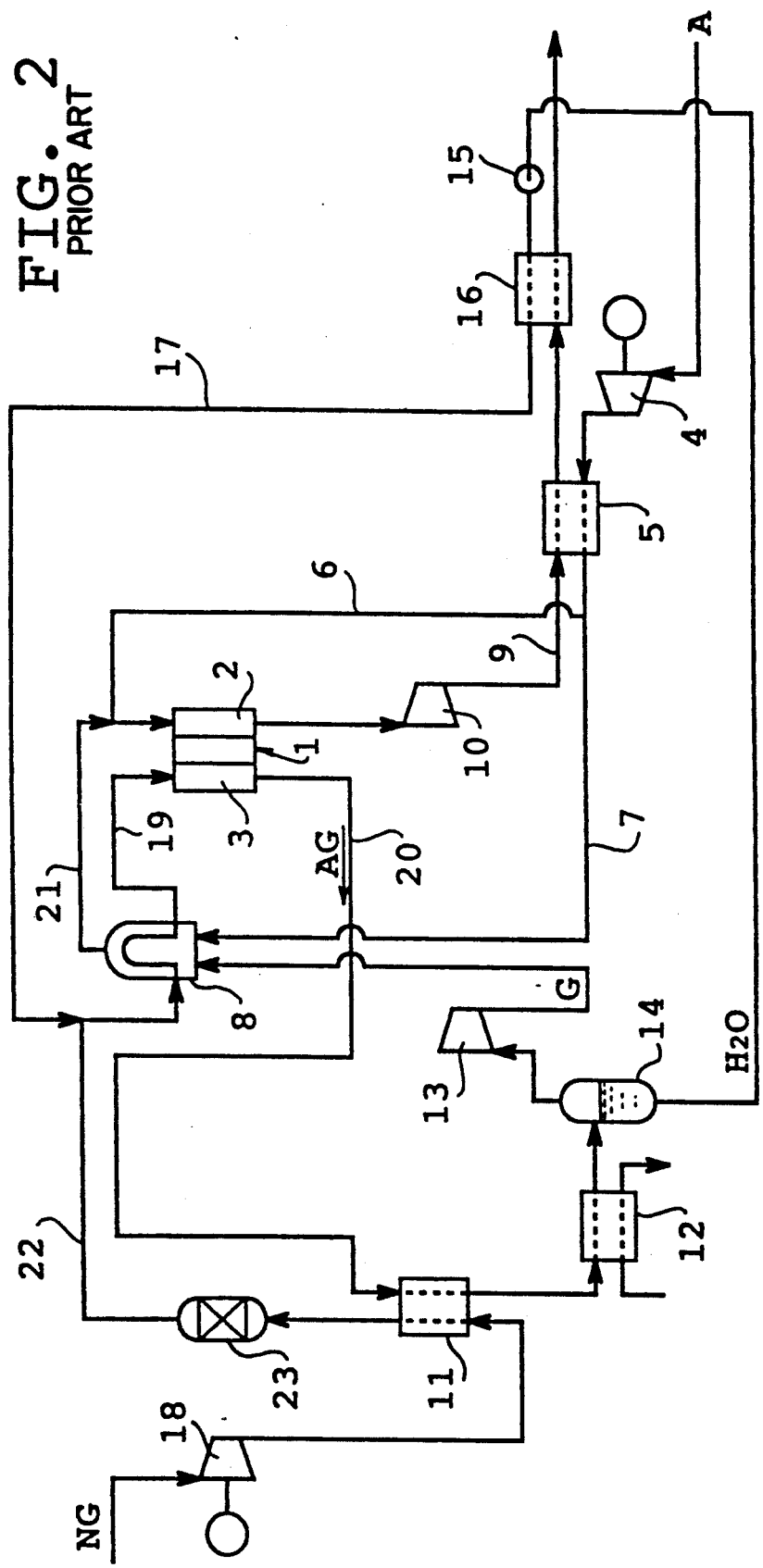
FIG. 2 is a schematic block diagram of a conventional power generation system.

First, a part of the system of FIG. 2 which is replaced by the system of FIG. 1 is reviewed. In the system of FIG. 2, gases discharged from the anode 3 of the fuel cell 1 (called "anode exhaust gas") AG are condensed by the condenser 12 and a gas component of the anode exhaust gas is separated from a moisture component by a gas-liquid separator 14. The gas component G is introduced to the reformer 8 whereas the moisture component is sent to the vapor producing device 16 by the pump 15 and transformed to steam therein. Then, the steam is introduced to the natural gas line 22 and merges with natural gas NG before entering the reformer 8. The just-described structure is changed by teaching of the present invention as shown in FIG. 1 and other part of the system is similar to FIG. 2.

Referring to FIG. 1, an anode exit gas line 20 of the fuel cell 1 is connected to the carbon dioxide gas separator 30 via a heat exchanger 26. The liquid absorbent 25 whose temperature is set to a predetermined value is introduced to the carbon dioxide gas separator 30 by an absorbent feed line 24.

The carbon dioxide gas separator 30 includes a vertical body 31 and a for-the-contact packed-bed 32 placed in the vertical body 31. The anode exhaust gas is introduced to the $CO_2$ separator 30 from the bottom of the separator body 31 and goes up through the packed bed 32. The absorbent 25 is introduced to the $CO_2$ separator 30 from the top of the separator body 31 and goes down through the packed bed 32. Thus, the anode exhaust gas and the absorbent 25 contact each other in the bed 32.

The absorbent 25 may be aqueous alkali salt solutions such as potassium carbonate, aqueous amine solutions such as diethanolamine or mixture of alkali salt and aqueous amine solutions.

The absorbent 25 fed to the carbon dioxide separator 30 from the absorbent feed line 24 contacts the anode exhaust gas AG flowing upward in the carbon dioxide separator 30 and then flows into the heat exchanger 26 through an absorbent discharge line 27. The absorbent 25 is heat-exchanged with the anode exhaust gas AG in the heat exchanger 26 and regenerated by a regenerator (not shown) before introduced into the absorbent feed line 24 again.

Inside the $CO_2$ separator 30, the liquid absorbent 25 and the anode exhaust gas undergo gas-liquid contact so that $CO_2$ of the anode exhaust gas is absorbed and removed by the absorbent 25. In this case, if a temperature of the absorbent 25 is maintained to a predetermined value, the anode exhaust gas from which $CO_2$ has been removed can contain enough steam for the reformation. In other words, when the absorbent 25 enters the $CO_2$ separator 30, the water component of the absorbent 25 is separated from the gas component of the absorbent 25, and the gas component (steam) is discharged from the $CO_2$ separator 30 with the anode exhaust gas. Therefore, an amount of steam to be formed in the $CO_2$ separator 30 can be adjusted by controlling the temperature of the absorbent entering the $CO_2$ separator 30 from the line 24. The anode exhaust gas AG which contains the steam is introduced to the reformer 8 through the anode gas line 28 and the heat exchanger 29. The raw material gas is also introduced to the reformer 8 from the raw material gas line 22. Consequently, the anode exhaust gas AG and the raw material gas undergo the reforming reaction in the reformer 8. At this situation, the anode exhaust gas AG contains sufficient moisture in the form of steam so that the anode exhaust gas AG can provide the moisture necessary for the reformation of raw material gas (natural gas) NG. The fuel gas prepared in the reformer 8 is fed to the anode 3 of the fuel cell 1 by the fuel gas line 19.

Experimental results of power generation using the above-described method and system will be now explained.

In order to produce the electrical power by the fuel cell 1 under the ambient or atmospheric pressure, the anode exhaust gas AG of 600°-700° C. was cooled approximately to 90° C. by the heat exchangers 29 and 26 while preheating the anode recycle gas and the absorbent 25, respectively. In the experiment, activated potassium carbonate of 30 wt % was employed as the absorbent 25. With the conditions just mentioned above, the temperature of the absorbent 25 introduced to the $CO_2$ separator 30 was adjusted to 75° C. Then, the anode exhaust gas AG whose pressure was 1.13 kg/cm² abs was discharged from the top of the $CO_2$ separator 30, and it was confirmed that the anode exhaust gas contained moisture of 29.4 mol %. Next, the anode exhaust gas AG was preheated by the preheater 29 and introduced to the reformer 8 with the externally supplied raw material gas NG which contained methane as its major component. The steam mol ratio for carbon element of methane in the reformer 8 was measured and a value of 1.71 was obtained. It was also confirmed that the power generation system was operated at a reforming rate of 66% of methane feed without carbon deposition (reforming temperature was 645° C.). It was further confirmed that when the fuel gas was introduced to the anode 3 of the fuel cell 1, about 56% of carbon monoxide and hydrogen contained in the fuel gas was used for the power generation. After that, the anode exhaust gas AG was cooled and introduced to the carbon dioxide separator 30 so that non-used hydrogen, carbon monoxide and methane were recovered and introduced to the anode 3 of the fuel cell 1 via the reformer 8 again. These recirculated gases contributed to the power generation, too. In this power generation system, the fuel utilization factor in the fuel cell was not high, but since non-used fuel was used again, the fuel utilization factor of the entire system was high (91%).

In the above embodiment, the absorbent 25 is heated to a predetermined temperature and the steam in the anode exhaust gas that is discharged from the $CO_2$ separator 30 is used as the moisture necessary for the reforming reaction in the reformer 8. However, all the moisture necessary for the reforming reaction should not be prepared by the $CO_2$ separator 30. For example, if the temperature of the absorbent 25 is maintained at a certain value and introduced to the $CO_2$ separator 30 but more steam is required for the reforming reaction, more steam may be added to the natural gas feed line 22 from the steam line 17 as required, as indicated by the dotted line. In this case, a total thermal efficiency is not lowered as compared with a conventional system even if an amount of steam fed through the line 17 may reach 50% of a total amount of moisture required for the reformation.

In addition, the reformer 8 is separate from the fuel cell 1 in the foregoing description. However, the reformer 8 may be incorporated in the fuel cell 1 such that the reaction heat of the fuel cell may be used for the reformer 8. In such a case, the reformer 8 is generally called "internal reformer".

Further, other various modifications and changes may be made to the present invention without departing from the spirit and scope of the present invention.

The present invention has following advantages.

(1) Only by selecting an appropriate operation temperature of the $CO_2$ separator, i.e., only by selecting an appropriate temperature of the absorbent, can the anode exhaust gas mixed with the raw material gas can have sufficient moisture (steam) for the reforming reaction. Thus, a steam producing device is unnecessary.

(2) Since it is possible to force the absorbent to absorb moisture whose amount is equal to moisture produced upon the cell reaction, in addition to the carbon dioxide, no further device is necessary for the water removal from the anode exhaust gas.

(3) Since the water vaporizer is unnecessary, the water treatment equipment (gas-liquid separator) is also unnecessary.

(4) Since the water vaporizer is not required, heat for vaporizing the water into steam is not required. Thus, a thermal efficiency of the system as a whole can be improved.

(5) A steam producing device may be also incorporated in the system. In other words, some of the steam may be prepared by the steam producing device, or a conventional system may be used to carry out the present invention.

We claim:

1. A method of producing electrical power using a molten carbonate fuel cell, a reformer and a $CO_2$ separator, the fuel cell having an anode and a cathode with raw material gas to be reformed being introduced to the reformer together with steam to obtain fuel gas, the fuel gas being introduced to the anode of the fuel cell, oxidizing gas being introduced to the cathode such that an electrochemical reaction takes place between the anode and the cathode, comprising the steps of (A) introducing to the $CO_2$ separator anode exhaust gas discharged from the anode;

(B) introducing liquid absorbent of a predetermined temperature to the $CO_2$ separator;

(C) allowing the anode exhaust gas to contact the absorbent inside the $CO_2$ separator such that $CO_2$ of the anode exhaust gas is absorbed and separated by the absorbent and such that the $CO_2$-removed anode exhaust gas contains in the form of steam moisture which corresponds to vapor pressure of the absorbent;

(C-2) controlling the predetermined temperature of the liquid absorbent to adjust an amount of the steam to be contained in the anode exhaust gas;

(D) introducing the $CO_2$-removed anode exhaust gas to the reformer from the $CO_2$ separator together with the raw material gas such that reformation of the raw material gas occurs and the raw material gas is converted into the fuel gas;

(E) feeding back to the anode the fuel gas which contains the anode exhaust gas to utilize non-used hydrogen contained in the anode exhaust gas for power generation; and (F) returning to the step (A) to repeat the steps (A)–(E).

2. The method of claim 1, wherein the step (A) is carried out such that the anode exhaust gas ascends in the $CO_2$ separator and the step (B) is carried out such that the liquid absorbent descends in the $CO_2$ separator whereby the anode exhaust gas and the liquid absorbent contact each other in the step (C).

3. The method of claim 2, wherein the predetermined temperature of the step (B) is determined such that an amount of steam contained in the anode exhaust gas discharged from the $CO_2$ separator is necessary for the reformation in the reformer.

4. The method of claim 3, wherein the liquid absorbent is heated to the predetermined temperature by the anode exhaust gas.

5. The method of claim 4, wherein the liquid absorbent is an aqueous alkali salt solution, an amine solution or mixture of alkali salt and amine solutions.

6. The method of claim 5, wherein the liquid absorbent which has absorbed $CO_2$ is discharged from the $CO_2$ separator and the liquid absorbent discharged from the $CO_2$ separator is heated up with the anode exhaust gas introduced to the $CO_2$ separator.

7. The method of claim 2, wherein the $CO_2$ separator includes a main body and a bed, the step (A) is carried out such that the anode exhaust gas is introduced to a bottom of the main body and ascends through the bed in the $CO_2$ separator and the step (B) is carried out such that the liquid absorbent is introduced to a top of the main body and descends through the bed in the $CO_2$ separator whereby the anode exhaust gas and the liquid absorbent contact each other in the bed.

8. A method of producing electrical power using a molten carbonate fuel cell, a reformer and a $CO_2$ separator, the fuel cell having an anode and a cathode with raw material gas to be reformed being introduced to the reformer together with steam to obtain fuel gas, the fuel gas being introduced to the anode of the fuel cell; oxidizing gas being introduced to the cathode such that an electrochemical reaction takes place between the anode and the cathode, comprising the steps of:

(A) introducing to the $CO_2$ separator anode exhaust gas discharged from the anode;

(B) introducing liquid absorbent to the $CO_2$ separator;

(C) allowing the anode exhaust gas to contact the absorbent inside the $CO_2$ separator such that $CO_2$ of the anode exhaust gas is absorbed and separated by the absorbent and such that the $CO_2$-removed anode exhaust gas contains in the form of steam moisture which corresponds to vapor pressure of the absorbent;

(C-2) controlling the temperature of the liquid absorbent to adjust an amount of the steam to be contained in the anode exhaust gas;

(D) mixing the $CO_2$-removed anode exhaust gas with the raw material gas;

(E) adding more steam into the raw material gas so as to feed more steam to the reformer to be used in the reformation in the reformer to obtain fuel gas if an amount of the steam of the step (C) is insufficient for the reformation; and (F) feeding back to the anode the fuel gas which contains the anode exhaust gas to utilize non-used hydrogen contained in the anode exhaust gas for power generation.

9. The method of claim 8, wherein the added steam of the step (E) is produced by heating water introduced to the anode of the fuel cell by a vaporizer.

* * * * *